June 4, 1963  F. A. MANNERS ETAL  3,092,760
SWITCHING CIRCUIT
Filed Dec. 14, 1959

INVENTOR.
Frank Alan Manners +
Terrence E. DeViney,
BY
John H. Leonard &
Clyde H. Haynes,
their Attorneys.

United States Patent Office 3,092,760
Patented June 4, 1963

3,092,760
SWITCHING CIRCUIT
Frank Alan Manners and Terrence E. De Viney, Cleveland, Ohio, assignors to Square D Company, Detroit, Mich., a corporation of Michigan
Filed Dec. 14, 1959, Ser. No. 859,357
9 Claims. (Cl. 317—148.5)

The present invention relates to a transistorized switching circuit and more particularly to a relay operating circuit for controlling the energization and de-energization of a relay coil so as to effect operation of the relay more precisely at preselected pick up and drop-out signal voltages.

It is well known in the field of designing relays that it usually takes a voltage of considerably higher magnitude to energize the relay and cause it to pick up or pull the armature against the stationary core than it does to maintain the relay picked up. Because of this, the relay will not drop out, or the armature fall away from the core, while the relay coil is energized until the voltage applied across the coil has been reduced to a drop out voltage considerably below the pick up voltage. Many times, a control circuit requires the operation of a relay in which the pick up and drop out signal voltages are of substantially the same, or very close, values. In other instances, a circuit requires that a relay pick up precisely at a certain signal voltage and drop out precisely at another signal voltage with accuracy greater than the normal tolerances within which relays normally operate.

One of the objects of the present invention is to overcome these deficiencies in prior relay circuits.

Another object of the invention is to provide a transistorized relay operating circuit which will cause a relay having poor and inaccurate pick up and drop out voltage characteristics to respond accurately and precisely to pick up and drop out signal voltages.

Another object of the invention is to provide a transistorized relay operating circuit which is precise in its operation and which will respond to both pick up and drop out signal voltages even though those voltages are very close to each other in magnitude or value.

Figure 1:
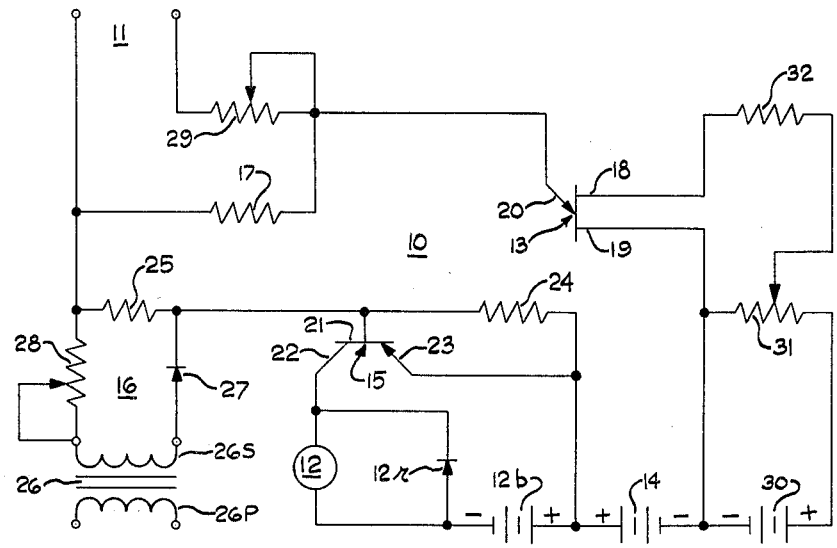
Figure 2:
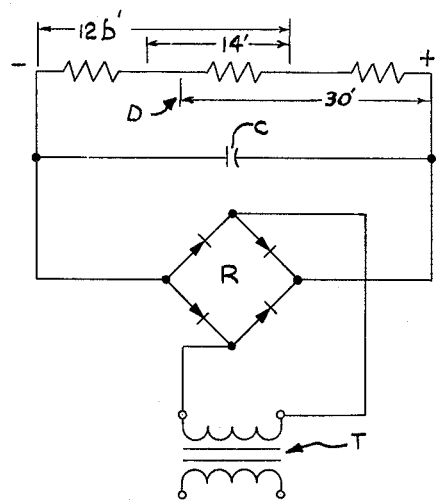

Other objects and a fuller understanding of the present invention may be had by referring to the appended claims defining the present new, novel and useful invention or discovery, to the following description of a specific means or method contemplated by the inventors for carrying out their invention, and to the accompanying drawing in which FIGURE 1 illustrates the preferred embodiment of the invention in a circuit diagram, and FIGURE 2 illustrates a power supply which may be substituted for the batteries of FIGURE 1.

The following description of the attached drawing and the accompanying claims jointly set forth one or more modifications incorporating the present invention and the advancement in the art of switching circuits. As used throughout the present description and claims, the specific terms used to identify the parts or components have been arbitrarily chosen to indicate to others commercially available parts or components which may be readily obtained to carry out the specific mode of the invention as described herein, and they are to be interpreted in their broad sense wherein they include electrically or mechanically equivalent components which will provide the same functions as those mentioned herein.

It is understood that the present illustration is for the purpose of exemplification and is not intended in any way to limit the scope of the invention either to the specific application illustrated or to the functions obtained thereby.

Referring now to the drawing, there is illustrated a closed loop circuit 10 responsive to a signal source 11 for controlling the energization of an electro-responsive device, for example, a relay having a coil 12, to cause the device or relay to pick up or drop out in accordance with pick up and drop out signal voltages in the signal source 11. Only the coil 12 of the relay is illustrated in the drawing, because the circuit may be used with any common relay and the design of the relay is not considered pertinent to the invention. The closed loop circuit 10 includes a uni-junction transistor 13, a bias battery 14, a transistor 15, a pulse voltage source 16, and a signal voltage resistor 17. Uni-junction transistor 13 has base connections 18 and 19 and an emitter 20. The emitter 20 and base connection 19 are connected in series in the loop circuit 10, with the base connection 19 connected to the negative side of battery 14. Transistor 15 has a base 21, a collector 22, and an emitter 23. The emitter 23 and base 21 are connected in series in the loop circuit 10 with the emitter 23 connected to the positive side of battery 14. Connected across base 21 and emitter 23 is a resistor 24. The pick up and drop out signal voltages from signal source 11 in response to the required energization of relay coil 12 are obtained by connecting the coil 12 in a series loop circuit with the collector 22, the emitter 23 and a battery 12b. A unidirectional current device such as a protecting rectifier 12r is connected in shunt with relay coil 12 to protect transistor 15 and as a discharge circuit for coil 12 during the time transistor 15 is pulsed off. The positive side of battery 12b is connected to the positive side of the battery 14 and the emitter 23.

Pulses of voltage are introduced into the loop circuit 10 by the pulse voltage source 16 for purposes to be later described. The pulse voltage source 16 is provided by connecting a resistor 25 in series in the loop circuit 10 between the resistor 17 and the interconnection of the base 21 and the resistor 24, and by establishing a voltage drop across resistor 25 by means of a transformer 26, a rectifier 27, and a potentiometer 28. The primary 26p of the transformer 26 is adapted for connection to a source of alternating current. The secondary 26s is connected in a series closed loop circuit with the resistor 25, the rectifier 27, and the potentiometer 28 which provides adjustment of the magnitude of the pulses of voltage which appear across resistor 25.

The pick up and drop out signal voltages from signal source 11 are introduced into the loop circuit 10 by connecting the signal source 11 across the resistor 17. One of the connections between signal source 11 and resistor 17 may be provided with a rheostat 29, if desired, to regulate or adjust the magnitude of the signal voltage established across the resistor 17.

The uni-junction transistor 13 is provided with a bias voltage across base connections 18 and 19 for purposes to be described later. This voltage is provided by a battery 30, having its negative side connected to the negative side of battery 14, a variable load resistor 31, and a resistor 32. The variable load resistor 31 is connected across the battery 30. The resistor 32 and base connections 18 and 19 are in turn connected in a closed loop across at least a portion of the load resistor 31.

After the circuit has been wired as above described, the load resistor 31 is adjusted until a bias voltage negative on base connection 19 and positive on base connection 18 appears on base connections 18 and 19. This bias voltage is of a magnitude or value such that uni-junction transistor 13 is biased off. Therefore no current will flow through emitter 20 until the voltage between emitter 20 and base connection 19 exceeds a certain firing point value. Usually this certain firing point value is approximately 60% of the voltage biased across the base connections 18 and 19 and the firing point value is determined by the characteristics of uni-junction transistor 13. In actual practice, the bias voltage across the emitter 20 to the base connection 19 is just below the firing point value, i.e. just below that voltage required to cause current to flow between emitter 20 and the base connection 19, and at a value which will keep the current flowing from the emitter 20 to the base connection 19 once the current has started to flow therebetween. This emitter 20 to base 19 bias voltage is provided by the bias battery 14. The signal source 11 provides the additional voltage necessary to bring the total voltage across the emitter 20 to base connection 19 to the firing point value at which current flow between the emitter 20 and the base connection 19 is initiated. The current flowing between emitter 20 and base connection 19 flows through the loop circuit 10.

It is apparent that the signal voltage across the resistor 17 need merely be sufficient to make up the difference between the bias voltage of battery 14 and the firing point voltage required across emitter 20 to base connection 19 to cause uni-junction transistor 13 to conduct the current flow from emitter 20 to base connection 19. In this way, only a very small pick up signal voltage from signal source 11 is needed to turn on uni-junction transistor 13 and to cause current flow in loop circuit 10.

As soon as current flow in loop circuit 10 is initiated, the current flows in the direction from emitter 23 to base 21. This flow of current from emitter 23 to base 21 causes transistor 15 to permit current flow between emitter 23 and collector 22 and thus in the circuit including relay coil 12. The current which flows through relay coil 12 is provided by the battery 12b and causes the relay to pick up.

It is thus noted that the pick up signal voltage required to effect energization of the relay coil 12 to cause the relay to pick up is the signal voltage impressed across the signal voltage resistor 17 by the signal source 11. In this way, energization of relay coil 12 is precisely and accurately controlled by an accurate pick up signal voltage even though the operation of the relay per se is usually considered very inaccurate.

The only way to effect de-energization of coil 12 thereby to cause the relay to drop out is to cause uni-junction transistor 13 to become non-conductive between the emitter 20 and the base connection 19. This is because one of the inherent characteristics of uni-junction transistor 13 is that it will continue to conduct current between emitter 20 and base connection 19 so long as there is a voltage drop between the emitter 20 and the base connection 19 greater than a turn off voltage below which the transistor does not conduct current. Removal of the signal voltage across signal voltage resistor 17 is insufficient, due to the bias battery 14 being in the loop circuit 10, to de-energize loop circuit 10 and thereby de-energize coil 12 to cause the relay to drop out. Therefore, a voltage sufficient to effectively cancel out the bias voltage from battery 14 is introduced in opposition to the bias battery 14 to turn off transistor 13. In this circuit, the voltage used to oppose or buck the voltage from bias battery 14 is provided by the hereinbefore described pulse voltage source 16 and appears across the pulse voltage resistor 25.

The turn off and turn on or firing voltage point or values of uni-junction transistor 13 is the algebraic sum of voltages appearing across bias battery 14, pulse voltage source 16 and signal voltage resistor 17. Since the voltage required to fire uni-junction transistor 13 to cause it to conduct current in loop circuit 10 is precisely determined by the characteristics of uni-junction transistor 13, the pick up signal voltage and the drop out signal voltages needed to cause operation of the relay may be precisely controlled. Adjustment of potentiometer 28 adjusts the voltage across pulse voltage source 16 and adjustment of rheostat 29 adjusts the voltage across signal voltage resistor 17. In this way, adjustment of potentiometer 28 determines the signal voltage required to cause the relay to drop out and adjustment of rheostat 29 determines the signal voltage required to cause the relay to pick up. The pick up and drop out signal voltages may be very close to each other in magnitude or far apart and may be within or outside of the normal manufacturing tolerances and voltage characteristics of the relay. As an example, if transformer primary 26P is connected to a sixty cycle source of voltage, the pulse voltage resistor 25 will provide a "switch off" voltage every other half cycle, i.e. sixty times each second. Assuming this voltage is large enough to reduce the voltage across the transistor below the turn off voltage of the transistor, then each time a pulse of voltage appears across pulse voltage resistor 25, uni-junction transistor 13 will be switched off. If the signal voltage across signal voltage resistor 17 is below the drop out signal voltage value when the pulse voltage across resistor 25 disappears, uni-junction transistor 13 will not be turned on again. Because of this, relay coil 12 will remain de-energized until a signal voltage of magnitude equal to the difference between the bias voltage of battery 14 and the firing point voltage required by the transistor 13 again appears across the resistor 17. Thus in effect, the coil 12 will be deenergized within one-half cycle of the time when the signal voltage across signal voltage resistor 17 is reduced to the point where it will not make up the difference between the magnitude of the voltage across bias battery 14 and the voltage required to fire or turn uni-junction transistor 13 on. Thus, the object of providing a transistorized switching circuit which will precisely respond to pick up and drop out signal voltages has been obtained.

FIGURE 2 illustrates a rectifier and transformer circuit which may be used in place of the batteries 12b, 14 and 30 to provide the required respective voltage sources. In this circuit, voltages from an alternating voltage source T are rectified by a full wave rectifier R and impressed across a voltage divider D. A filter capacitor C is connected across the output of the rectifier R. The sections 12b', 14', and 30' of the voltage divided D provide voltage of the same polarity as the batteries 12b, 14 and 30 respectively and therefore may be inserted in FIGURE 1 in place of the respective batteries.

Although this invention has been described in its preferred form with a certain degree of particularity, is is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A transistorized circuit for controlling the energization of a relay coil energizable by current in accordance with a signal voltage, said circuit comprising a first circuit adapted for energizing a relay coil and including a first transistor operable for controlling the flow of current in said first circuit, a second circuit including a second transistor controlling the operation of said first transistor, means for applying a bias voltage to said second transistor, means for applying said signal voltage from a signal source to said second transistor, means providing a reference signal voltage in said second circuit in series with said signal voltage and having a polarity in fixed relation to the polarity of said signal voltage, whereby the second circuit impresses the combined voltages on said second transistor thereby causing it to control the operation of said first transistor in accordance with said signal voltage.

2. The structure as defined in claim 1 additionally including the feature of said second transistor being a uni-junction transistor and means impressing continually repeated voltage pulses in said second circuit means to render said second transistor non-conductive.

3. A transistorized circuit including a relay coil energizable in accordance with a signal voltage from a source of signal voltage, said circuit comprising means for energizing said relay coil, a switching transistor controlling said means, a uni-junction transistor, a closed loop circuit connecting the uni-junction transistor to the switching transistor for controlling said switching transistor, means for applying a bias voltage to said uni-junction transistor, means in said closed loop circuit for applying said signal voltage from said signal source to said uni-junction transistor, and means providing a continually repeated voltage signal in said closed loop circuit in series with said first mentioned signal voltage.

4. A relay operating circuit for controlling the energization and de-energization of a relay coil so as to effect operation of the relay more precisely at preselected pickup and drop-out signal voltages, said circuit comprising a coil energizing circuit including a relay coil, a first transistor having an emitter, a base and a collector, and a source of coil energizing voltage, said coil, emitter, collector, and source being serially connected with each other by said circuit so as to energize the coil when the first transistor is rendered conductive and to de-energize the coil when the first transistor is rendered non-conductive, a signal responsive circuit including a serially connected second transistor, a source of pick-up and drop-out signal voltage, a first source of bias voltage, a source of continually repeated pulses of voltage, and said emitter and said base of said first transistor, to render said first transistor conductive and non-conductive by the combined voltages in the signal responsive loop, and a second biasing voltage source connected to the second transistor means for impressing a voltage thereon to establish the voltage at which the second transistor means becomes conductive and non-conductive of the current in the signal responsive loop.

5. A relay operating circuit according to claim 4 wherein the first source of bias voltage alone is inoperative to render the second transistor means conductive, but is operative to maintain it conductive after it has been rendered conductive, the signal source and said first source of bias voltage combined are operative to render the second transistor means conductive, but are inoperative thereafter to render the second transistor means non-conductive.

6. A relay operating circuit according to claim 5 wherein said source of pulse voltage, said signal source, and said first source of bias voltage combined are operative to render said second transistor non-conductive.

7. A relay operating circuit according to claim 4 and including a first adjusting means for adjusting the voltage of said signal source, and additional adjusting means operable independently of the first adjusting means for adjusting said source of pulse voltage.

8. A relay operating circuit according to claim 4, wherein said source of pulse voltage provides continually repeated pulses of the same polarity of an alternating voltage.

9. A circuit according to claim 3 wherein a uni-directional current device is connected across said relay coil so that current flow through said coil is maintained during the periods when the combined pulse voltage and signal voltage are impressed.

References Cited in the file of this patent
UNITED STATES PATENTS

| | | |
|---|---|---|
| 2,889,496 | Moore | June 2, 1959 |
| 2,913,636 | Morrow | Nov. 17, 1959 |
| 2,918,609 | Elliot | Dec. 22, 1959 |
| 2,923,863 | Chesson et al. | Feb. 2, 1960 |
| 2,927,259 | Neal | Mar. 1, 1960 |
| 3,018,420 | Norris | Jan. 23, 1962 |